W. J. HISS.
CONDUIT OR CABLE CLAMP AND BRIDLE RING.
APPLICATION FILED JAN. 12, 1920.
1,365,614.
Patented Jan. 11, 1921.
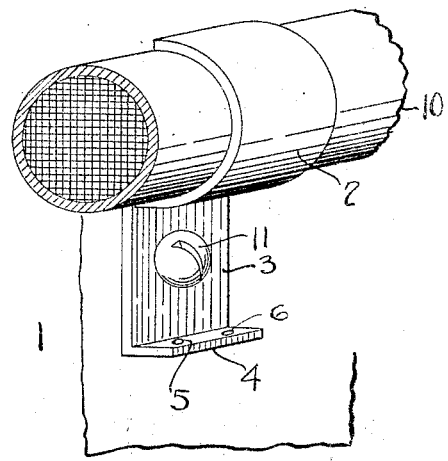
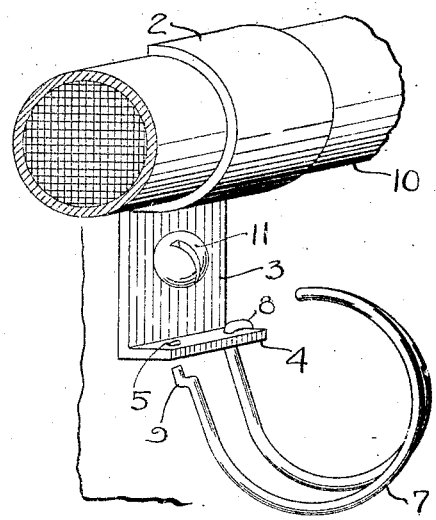
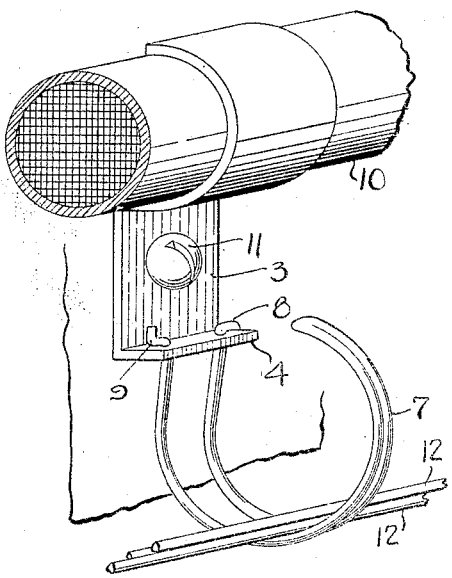
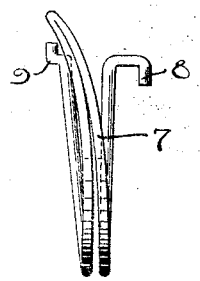
William J. Hiss
INVENTOR
BY
ATTORNEY

UNITED STATES PATENT OFFICE.

WILLIAM J. HISS, OF NEW YORK, N. Y., ASSIGNOR TO DIAMOND EXPANSION BOLT COMPANY, OF NEW YORK, N. Y., A CORPORATION OF NEW YORK.

CONDUIT OR CABLE CLAMP AND BRIDLE-RING.

1,365,614.   Specification of Letters Patent.   Patented Jan. 11, 1921.

Application filed January 12, 1920. Serial No. 351,042.

*To all whom it may concern:*

Be it known that I, WILLIAM J. HISS, a citizen of the United States, residing in the borough of Manhattan, county, city, and State of New York, have invented certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp having a hook and base portion, the base portion being provided with a flange having openings to receive the two ends of a bridle ring.

My invention further relates to a conduit or cable clamp which is preferably formed out of pressed sheet material or pressed steel, or which may be formed from castings of malleable iron, brass, an alloy, aluminum, or any other metal, or may be made out of pressed fibrous material.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit and cable clamp and of a cable which it supports;

Fig. 2 is a perspective view of the conduit or cable clamp and the bridle ring in the first position of assembling these two parts.

Fig. 3 is a perspective view similar to Fig. 2 but showing the bridle ring secured to the conduit or cable clamp;

Fig. 4 is a detail view of the bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit and cable clamp may be used as a separate article of manufacture or sub-combination, and then later, when the needs of the service demands it, my bridle ring may be supported by the same conduit or cable clamp, when the complete combination would be used.

In my invention I form my cable or conduit clamp 1 with a hook portion 2 and a base 3. A portion of the base is turned out at an angle to form a flange 4. This flange is provided with two openings 5 and 6 to coöperate with the bridle ring 7.

Preferably the conduit or cable clamp 1 is formed out of pressed sheet material, though it may be otherwise formed as previously explained. The bridle ring 7 is formed out of wire bent back on itself having one of its ends formed into a hook 8 and the other end bent to form a shoulder 9.

The conduit or cable clamp 1 may be used alone to support the cable 10, as shown in Fig. 1. At the same time that the cable 10 is hung, or weeks or years later, the service of this installation can be greatly augmented, at slight expense, by stringing strands of bridle wires 12, 12 by means of the bridle rings 7.

Without unscrewing the screw 11 the bridle ring 7 is positioned by first inserting the hook 8 in the hole 6, Fig. 2, and then manipulating the other end through the hole 5 so that the shoulder 9 rests upon the upper surface of the flange 4.

Should at any future time it be desired to remove the bridle wires 12, 12 and the bridle ring 7, this can be done by reversing the operation above described.

It will be noted that in my improved construction no tapping or screw threading of the base 3 is required and that it is not necessary or desirable to screw thread the bridle ring, all of which saves expense of manufacture.

Having thus described this invention in connection with an illustrative embodiment thereof, to the details of which I do not desire to be limited, what is claimed as new and what is desired to secure by Letters Patent is set forth in the appended claims.

What I claim is:

1. The combination of a conduit or cable clamp provided with a hook portion and a base, the base being provided with a flange having openings to receive the ends of a bridle ring, and a wire bridle ring formed by bending a piece of wire on itself, one end being formed with a hook and the other with a shoulder to coöperate with the flange.

2. A new article of manufacture comprising a bridle ring formed of wire bent back on itself to form an open ring, one end of the ring being free or unsupported the other end of the ring being formed by the two ends of the wire, one end of the wire being provided with a hook and the other end of the wire with a shoulder to engage with a conduit or cable clamp.

WILLIAM J. HISS.

Witnesses:
AMMIÉ E. CAMERON,
MILDERD C. WILTSEY.